(12) United States Patent
Gudarzi et al.

(10) Patent No.: US 12,269,544 B2
(45) Date of Patent: Apr. 8, 2025

(54) IMAGE BASED TRAILER WHEELBASE DETERMINATION

(71) Applicant: Stoneridge, Inc., Novi, MI (US)

(72) Inventors: Mohammad Gudarzi, San Diego, CA (US); Liang Ma, Rochester, MI (US); Utkarsh Sharma, Troy, MI (US); Troy Otis Cooprider, White Lake, MI (US)

(73) Assignee: STONERIDGE, INC., Novi, MI (US)

( * ) Notice: Subject to any disclaimer, the term of this patent is extended or adjusted under 35 U.S.C. 154(b) by 270 days.

(21) Appl. No.: 17/347,902

(22) Filed: Jun. 15, 2021

(65) Prior Publication Data
US 2022/0396322 A1 Dec. 15, 2022

(51) Int. Cl.
| | |
|---|---|
| *B62D 63/08* | (2006.01) |
| *B60R 1/12* | (2006.01) |
| *B60R 1/22* | (2022.01) |
| *B60R 1/00* | (2022.01) |

(52) U.S. Cl.
CPC ............ *B62D 63/08* (2013.01); *B60R 1/22* (2022.01); *B60R 1/002* (2013.01); *B60R 1/003* (2013.01); *B60R 2300/301* (2013.01); *B60R 2300/8026* (2013.01); *B60R 2300/8046* (2013.01); *B60R 2300/8086* (2013.01)

(58) Field of Classification Search
CPC ........... B62D 63/08; B60R 1/22; B60R 1/002; B60R 1/003; B60R 2300/301; B60R 2300/8026; B60R 2300/8046; B60R 2300/8086
See application file for complete search history.

(56) References Cited

U.S. PATENT DOCUMENTS

| | | | | |
|---|---|---|---|---|
| 2014/0085472 A1* | 3/2014 | Lu | ........................... | B60R 1/002 |
| | | | | 348/148 |
| 2017/0341583 A1* | 11/2017 | Zhang | ....................... | B60R 1/00 |
| 2018/0056868 A1* | 3/2018 | Naserian | ................. | B60R 1/003 |
| 2018/0319437 A1* | 11/2018 | Hu | ......................... | B62D 13/06 |

FOREIGN PATENT DOCUMENTS

| | | | | |
|---|---|---|---|---|
| DE | 102010006521 A1 | * | 9/2010 | ............. B60D 1/245 |
| JP | 2014002056 A | * | 1/2014 | |
| WO | WO-2020207572 A1 | * | 10/2020 | ............ B60T 8/1708 |

OTHER PUBLICATIONS

European Search Report for Application No. 22177585.1 completed on Oct. 26, 2022.

* cited by examiner

*Primary Examiner* — Jeffery A Williams
*Assistant Examiner* — Tyler B Edwards
(74) *Attorney, Agent, or Firm* — Carlson, Gaskey & Olds, P.C.

(57) ABSTRACT

A method for determining a trailer detection parameter of a trailer including receiving an image from at least one camera at a controller. The at least one camera defines a field of view including at least a portion of a vehicle trailer. The method determines a trailer angle of the vehicle trailer relative to a tractor, identifies at least one feature in an image of the trailer, determines a two-dimensional distance from the at least one feature to a predefined position on the image, and converts the two-dimensional distance to a three-dimensional distance based at least in part on the determined angle. The three-dimensional distance is a trailer detection parameter of the trailer.

22 Claims, 5 Drawing Sheets

IMAGE BASED TRAILER WHEELBASE DETERMINATION

TECHNICAL FIELD

This disclosure relates to a camera mirror system (CMS) for use in a commercial truck, and in particular to a system and method for determining a trailer wheelbase length using a CMS.

BACKGROUND

Mirror replacement systems, and camera systems for supplementing mirror views, are utilized in commercial vehicles to enhance the ability of a vehicle operator to see a surrounding environment. Camera mirror systems (CMS) utilize one or more cameras to provide an enhanced field of view to a vehicle operator. In some examples, the mirror replacement systems cover a larger field of view than a conventional mirror, or include views that are not fully obtainable via a conventional mirror.

In certain operations, such as trailer reversing maneuvers, knowledge of the true trailer angle, and other trailer feature positions, can prove to be particularly beneficial to the performance of automated and semi-automated vehicle systems. While purely tractor-based trailer angle positioning systems (i.e., systems for determining a relative trailer angle between the trailer and the tractor) exist, many such systems rely on, or otherwise utilize the specific length of the trailer. Connecting a trailer of a different length (e.g. connecting a 5 m trailer when the systems expect a 10 m trailer) can result in imprecise or inaccurate determinations within the system, which in turn result in reduced performance of the vehicle systems relying on the determinations.

In one particular example, kinematic models that are reliant on the trailer length are skewed when an inaccurate trailer length is utilized.

SUMMARY OF THE INVENTION

An exemplary method for determining a trailer detection parameter of a trailer includes receiving an image from at least one camera at a controller, the at least one camera defining a field of view including at least a portion of a vehicle trailer, determining a trailer angle of the vehicle trailer relative to a tractor, identifying at least one feature in an image of the trailer, determining a two-dimensional distance from the at least one feature to a predefined position on the image, and converting the two-dimensional distance to a three-dimensional distance based at least in part on the determined angle, wherein the three-dimensional distance is a trailer detection parameter of the trailer.

In another example of the above described method for determining a trailer detection parameter of a trailer the determined trailer angle is in the range of 20 to 70 degrees.

In another example of any of the above described methods for determining a trailer detection parameter of a trailer the trailer detection parameter is a wheelbase length and the at least one feature is at least one wheel.

In another example of any of the above described methods for determining a trailer detection parameter of a trailer the at least one wheel includes a first wheel and a second wheel, and the two-dimensional distance from the at least one wheel to the predefined position on the image is a distance from a mid-point between the first wheel and the second wheel to the predefined position on the image.

In another example of any of the above described methods for determining a trailer detection parameter of a trailer the at least one wheel is a single wheel, and wherein the two-dimensional distance from the at least one wheel to the predefined position on the image is a distance from a mid-point of the wheel to the predefined position on the image.

In another example of any of the above described methods for determining a trailer detection parameter of a trailer the trailer detection parameter is a trailer length from a hitch point to a rear edge of the trailer and the at least one feature is a feature disposed at the rear edge of the trailer.

In another example of any of the above described methods for determining a trailer detection parameter of a trailer the feature disposed at the rear edge of the trailer is a bottom corner of the trailer.

In another example of any of the above described methods for determining a trailer detection parameter of a trailer converting the two-dimensional distance to the three-dimensional distance based at least in part on the determined angle comprises cross referencing the two-dimensional distance with the determined angle using a conversion function.

Another example of any of the above described methods for determining a trailer detection parameter of a trailer further includes reiterating the method across multiple trailer angles within the range of 20 to 70 degrees and storing each determined three-dimensional wheelbase length in a memory.

Another example of any of the above described methods for determining a trailer detection parameter of a trailer further includes filtering the stored three-dimensional wheelbase lengths using a median pass filter.

In another example of any of the above described methods for determining a trailer detection parameter of a trailer the memory stores an output of the median pass filter as a determined wheel base length.

In another example of any of the above described methods for determining a trailer detection parameter of a trailer identifying at least one wheel in an image of the trailer comprises identifying the at least one wheel using an image-based object detection system stored in the controller.

In another example of any of the above described methods for determining a trailer detection parameter of a trailer the controller is one of a vehicle control unit and a camera mirror system controller.

In another example of any of the above described methods for determining a trailer detection parameter of a trailer the field of view is one of a class II view and a class IV view.

In one exemplary embodiment a camera mirror system for a vehicle includes at least one camera defining a field of view including at least a portion of a trailer, a controller including a processor and a memory storing an image-based object detection module configured to identify at least one wheel within the object detection system, a trailer angle module configured to determine a trailer angle relative to a tractor, and a trailer detection parameter determination module configured to determine a trailer wheelbase length based on the trailer angle and an image received from the at least one camera.

In another example of the above described camera mirror system for a vehicle the field of view is one of a class II and a class VI view.

In another example of any of the above described camera mirror systems for a vehicle the trailer detection parameter determination module includes instructions configured to cause the processor to determine a two-dimensional distance from the at least one trailer parameter to a predefined position on the image and convert the two-dimensional distance to a three-dimensional distance based at least in part on the determined angle, wherein the three-dimensional distance is a wheelbase length of the trailer.

In another example of any of the above described camera mirror systems for a vehicle converting the two-dimensional distance to the three-dimensional distance comprises cross referencing a determined trailer angle corresponding to the image and the two-dimensional distance in a conversion function.

In another example of any of the above described camera mirror systems for a vehicle the determined three-dimensional distance is stored in a memory listing of determined three-dimensional distances.

In another example of any of the above described camera mirror systems for a vehicle the controller further stores a filtering module configured to filter the memory listing of determined three-dimensional distances.

In another example of any of the above described camera mirror systems for a vehicle the filtering module is a median pass filter.

In one exemplary embodiment a vehicle controller includes an image input configured to receive an image form at least one camera, a processor and a memory, the memory storing an image-based object detection module configured to identify at least one feature within a received image, a trailer angle module configured to determine a trailer angle relative to a tractor, and a trailer detection parameter determination module configured to determine a trailer detection parameter based on the trailer angle and an image received from the at least one camera.

In another example of the above described vehicle controller the trailer detection parameter determination module includes instructions configured to cause the processor to determine a two-dimensional distance from the at least one wheel to a predefined position on the image and convert the two-dimensional distance to a three-dimensional distance based at least in part on the determined angle by cross referencing a determined trailer angle corresponding to the image and the two-dimensional distance in conversion function, wherein the three-dimensional distance is a wheelbase length of the trailer.

In another example of the above described vehicle controller the memory further includes a filtering module configured to filter the memory listing of determined three-dimensional distances using a median pass filter.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1A:
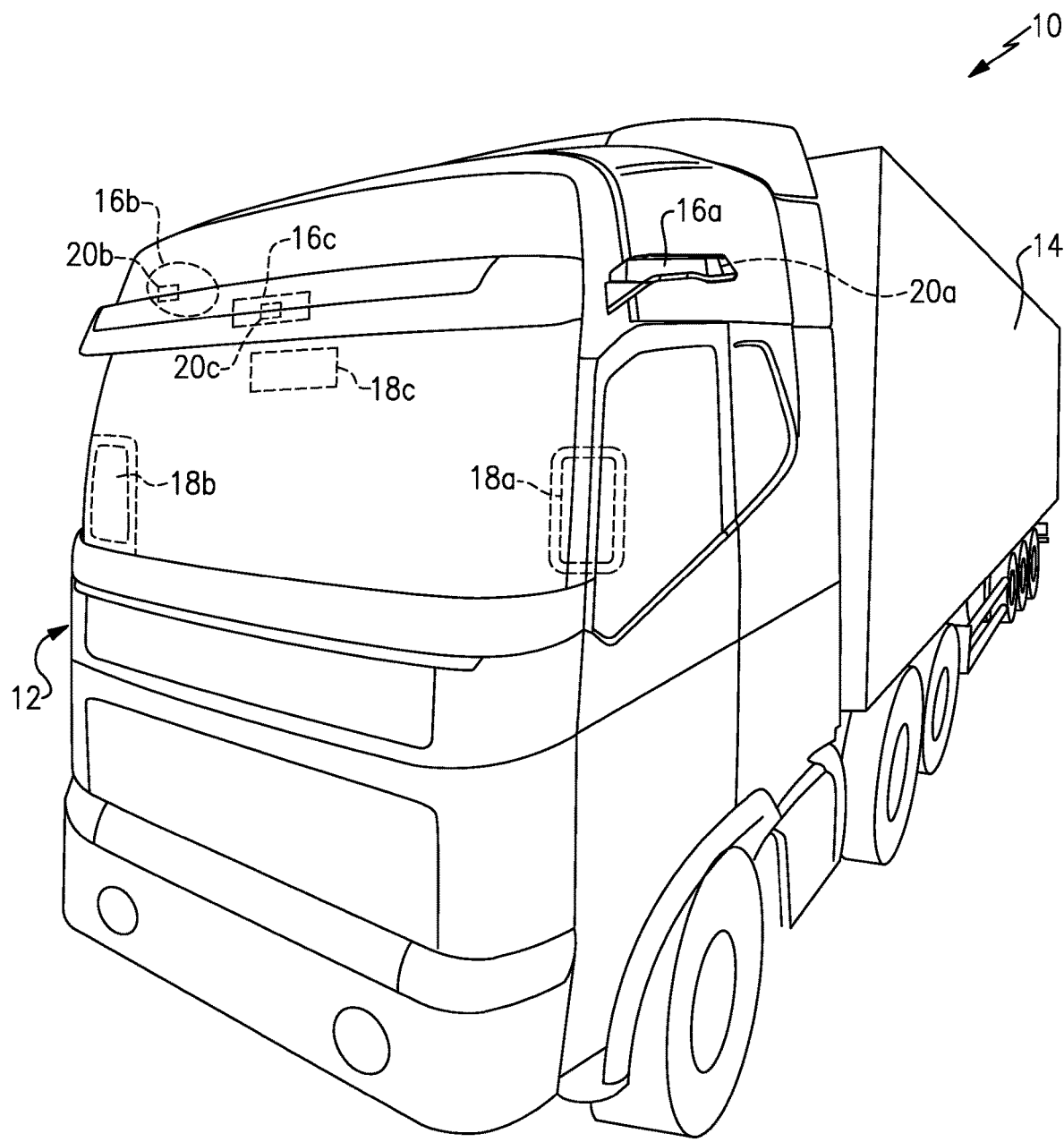
FIG. 1A is a schematic front view of a commercial truck with a camera mirror system (CMS) used to provide at least Class II and Class IV views.
Figure 1B:
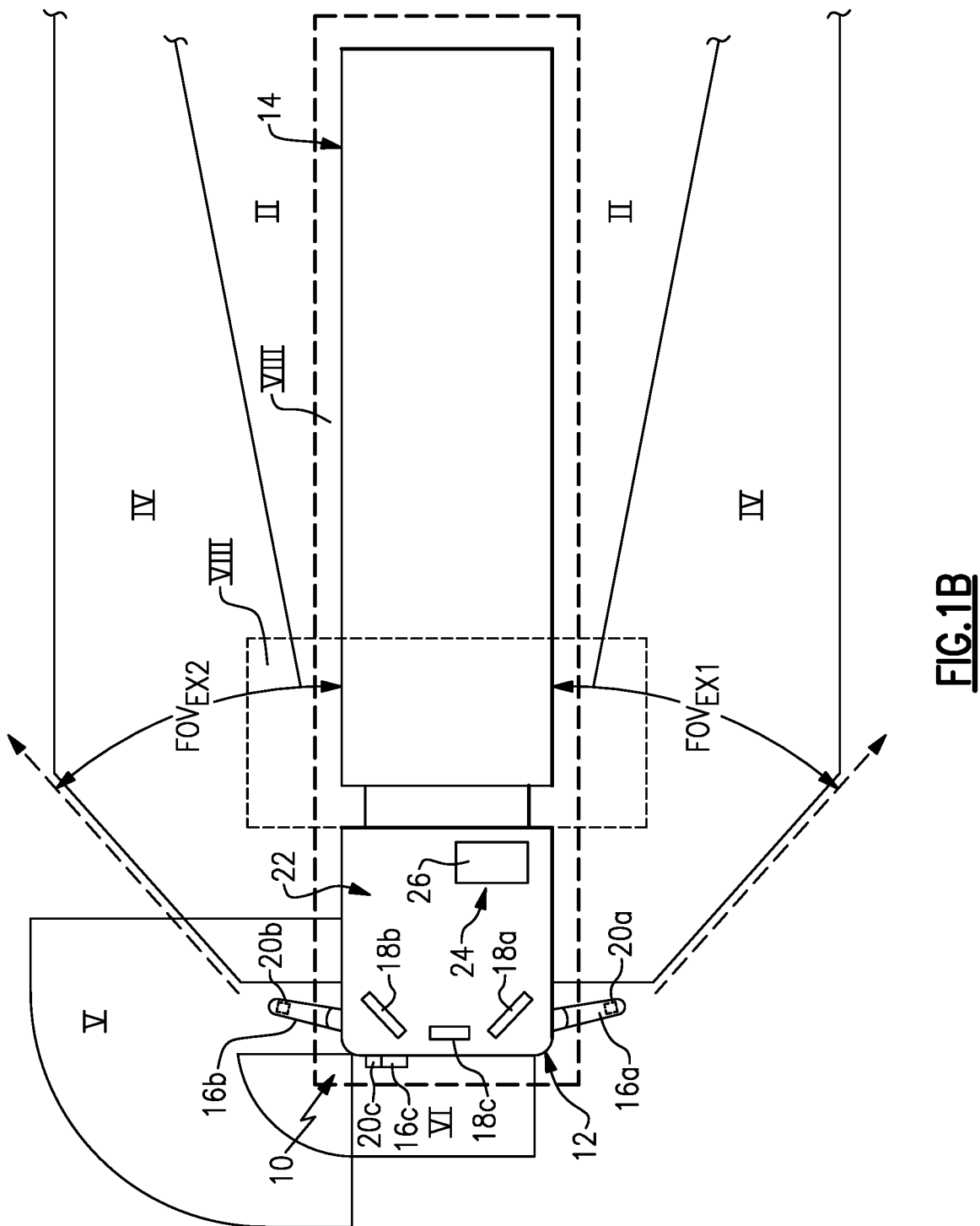
FIG. 1B is a schematic top elevational view of a commercial truck with a camera mirror system providing Class II, Class IV, Class V and Class VI views.
Figure 2:
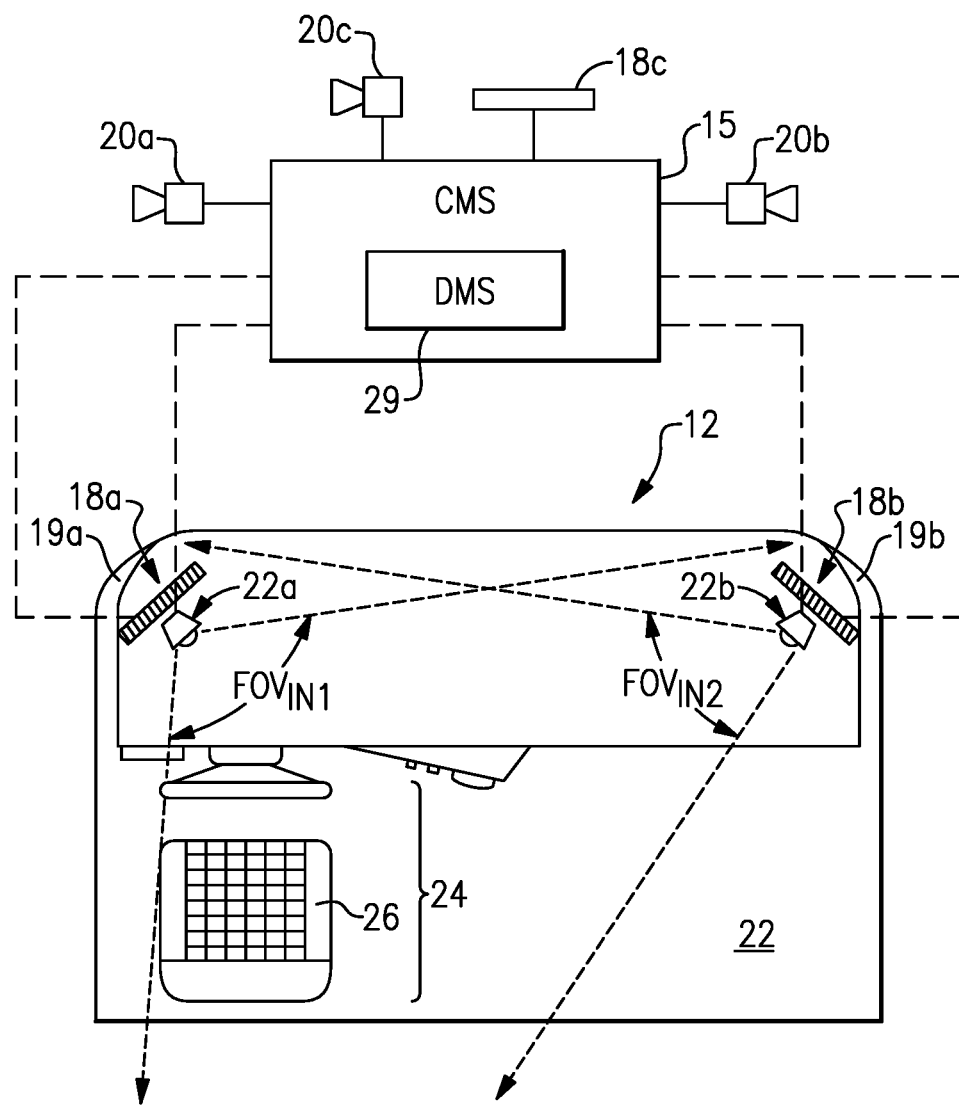
FIG. 2 is a schematic top perspective view of a vehicle cabin including displays and interior cameras.
Figure 3:
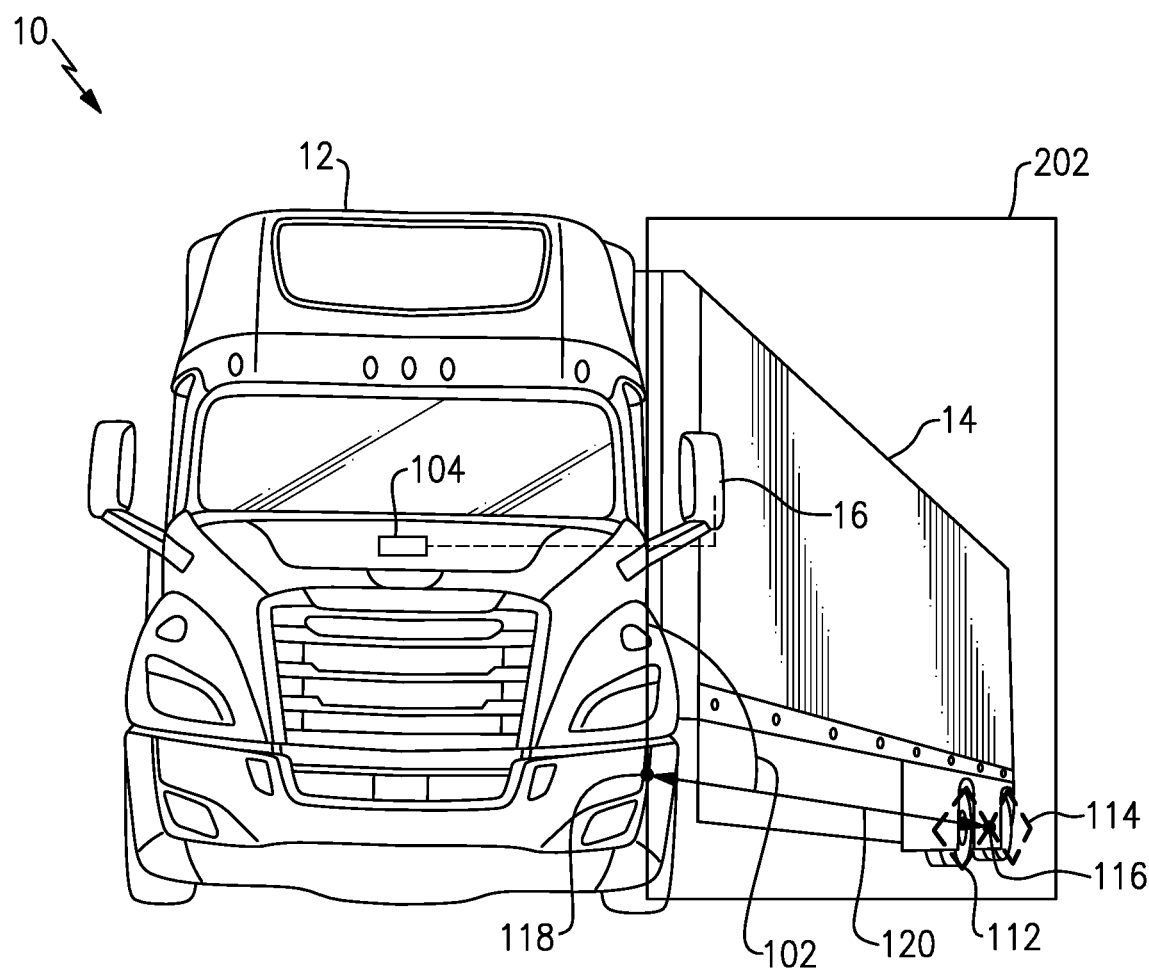
FIG. 3 schematically illustrates the vehicle during a turning operation, with the tractor and the trailer at a predefined angle.

A schematic view of a commercial vehicle 10 is illustrated in FIGS. 1A and 1B. The vehicle 10 includes a vehicle cab or tractor 12 for pulling a trailer 14. Although a commercial truck is contemplated in this disclosure, the invention may also be applied to other types of vehicles. The vehicle 10 incorporates a camera mirror system (CMS) 15 (FIG. 2) that has driver and passenger side camera arms 16a, 16b mounted to the outside of the vehicle cab 12. If desired, the camera arms 16a, 16b may include conventional mirrors integrated with them as well, although the CMS 15 can be used to entirely replace mirrors. In additional examples, each side can include multiple camera arms 16, with each arm 16 housing one or more cameras and/or mirrors.

Each of the camera arms 16a, 16b includes a base that is secured to, for example, the cab 12. A pivoting arm is supported by the base and may articulate relative thereto. At least one rearward facing camera 20a, 20b is arranged respectively within camera arms. The exterior cameras 20a, 20b respectively provide an exterior field of view $FOV_{EX1}$, $FOV_{EX2}$ that each include at least one of the Class II and Class IV views (FIG. 1B), which are legal prescribed views in the commercial trucking industry. The class II view on a given side of the vehicle 10 is a subset of the class IV view of the same side of the vehicle 10. Multiple cameras also may be used in each camera arm 16a, 16b to provide these views, if desired. Each arm 16a, 16b may also provide a housing that encloses electronics that are configured to provide various features of the CMS 15.

First and second video displays 18a, 18b are arranged on each of the driver and passenger sides within the vehicle cab 12 on or near the A-pillars 19a, 19b to display Class II and Class IV views on its respective side of the vehicle 10, which provide rear facing side views along the vehicle 10 that are captured by the exterior cameras 20a, 20b.

If video of Class V and Class VI views are also desired, a camera housing 16c and camera 20c may be arranged at or near the front of the vehicle 10 to provide those views (FIG. 1B). A third display 18c arranged within the cab 12 near the top center of the windshield can be used to display the Class V and Class VI views, which are toward the front of the vehicle 10, to the driver.

If video of class VIII views is desired, camera housings can be disposed at the sides and rear of the vehicle 10 to provide fields of view including some or all of the class VIII zones of the vehicle 10. In such examples, the third display 18c can include one or more frames displaying the class VIII views. Alternatively, additional displays can be added near the first, second and third displays 18a, 18b, 18c and provide a display dedicated to providing a class VIII view.

With reference specifically to FIG. 1B, the trailer 14 is hitched to the tractor 12 via a hitch 102. The trailer 14 includes a set of wheels 112, 114 and the distance 120 from a center point 116 of the set of wheels, and the hitch 102 is referred to as the wheelbase of the trailer 14. Similarly, the length from hitch point of the trailer to the rear edge of the trailer is referred to as the trailer length. A given tractor 12 can connect to multiple different trailers 14, with the different trailers 14 having different potential wheelbase lengths and different potential trailer lengths. In some examples the wheelbase length can range between 5 m (16.4 ft) and 15 m (49.2 ft), although alternative lengths can be implemented without substantially altering the vehicle 10 configuration. A similar range can be present for the trailer length.

Certain vehicle operations utilize default wheelbase length assumptions as input parameters. By way of example semi-automated mirror panning systems, kinematic models for automated and/or semi-automated driver assistance systems, and similar vehicle systems may utilize the wheelbase length to assist in their operations. While the default wheelbase assumptions can provide acceptable input parameters for some systems, it is appreciated that some systems performed by the vehicle ECU (e.g., a kinematics model based semi-automatic driver assist system) as well as some systems performed locally within a camera mirror system itself (e.g., an automatic panning system) can benefit from a more accurate determination of the actual wheelbase of the trailer 14.

With continued reference to FIGS. 1A, 1B and 2, FIG. 3 schematically illustrates the vehicle 10 during a turning operation, with the tractor 12 and the trailer 14 at an angle 102 within a predefined range of angles. During the turning operation, a camera arm 16 of the trailer 12 includes one or more cameras that capture a field of view 202 including the trailer 14, and the wheels 112, 114, as well as other portions of the vehicle 10. The field of view 202 can be any of the class views described above, or a view provided by another camera (or cameras) mounted to the camera arm 16, or to a similar position.

A controller 104 connected to the camera receives the field of view 202 and preforms an image-based analysis of the received image. The controller 104 can be a camera mirror system controller disposed in the camera arm 16, a general vehicle controller disposed in the trailer 12, or any other controller communicatively connected to the camera (s) in the camera arm 16.

Contained within the controller 104 is an image-based object detection system. The image-based object detection type system uses software to analyze the received images and identify one or more objects within the image. The object detection system can be any known object detection including rule based, machine learning based, or any other known object detection methodology. Included within the set of objects that can be identified are the rear wheels 112, 114 of the trailer 14.

Figure 4:
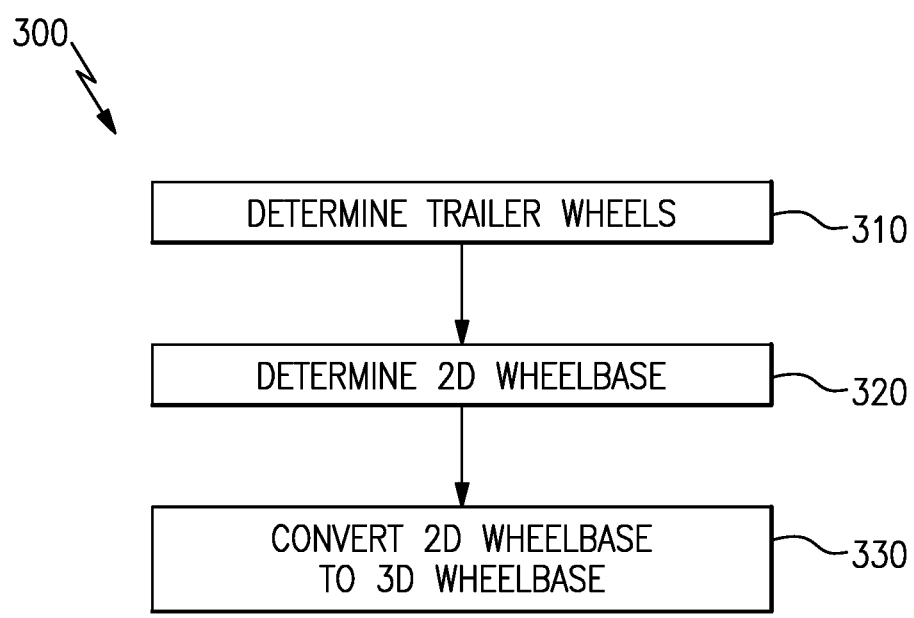
FIG. 4 schematically illustrates a process for determining a wheelbase length based on an image containing the trailer.

Also included in the controller 104 is a trailer detection parameter determination software module. As used herein, trailer detection parameters refer to parameters indicative of a trailer length including the length from a hitch point to a rear edge of the trailer (i.e. the trailer length) and the length from the hitch point to the rear wheels (i.e. the wheelbase length) of the trailer. In one example, the trailer detection parameter determination software module is configured to utilize the position(s) of the identified wheels 112, 114 to determine a wheelbase length of the trailer 14 according to a process 300 illustrated in FIG. 4. Initially the process 300 identifies the position of each wheel on the trailer 14 within the image using the object detection system in an identify trailer wheels step 310. The object detection system identifies the forward wheels 112 and the rear wheels 114 in the set of wheels 110, as well as a midpoint 116 between the forward wheels 112 and the rear wheels 114.

The process 300 then determines a two-dimensional distance from the midpoint 116 to a predefined position 118 at an edge of the field of view in a "Determine 2D Wheelbase" step 320. The predefined position 118 is selected based on the expected position of the vehicle trailer 12 at the edges of the field of view 202 and may be dependent on the trailer angle. In alternate examples, the predefined position can be any other position within the image that is known to correlate to a hitch point. As used herein, the two-dimensional distance refers to the measured distance between the midpoint 116 and the predefined position 118 within the image itself. The measured distance is, in one example, the number of pixels between the midpoint 116 and the predefined position 118. As can be appreciated, the two-dimensional distance is not the same as the wheelbase length 120. However, the two-dimensional distance 120 correlates to the wheelbase length based on the trailer angle 102. By determining the two-dimensional length while the vehicle is within a predetermined range of angles (e.g., between 20 and 70 degrees) the controller 104 can utilize the measured two-dimensional length and the known correlation for the determined angle to accurately determine the wheelbase length of the vehicle using a conversion function in a "Convert 2D Wheelbase to 3D Wheelbase" step 330.

In one example, the conversion function uses a software module including multiple lookup tables to determine a best fit three-dimensional wheelbase length. The lookup tables provide a mapping defining a number of pixels (the 2D length) in the two-dimensional images to the 3D distances for the range of angles with the first axis being the 2D length and the second axis being the corresponding 3D distances. Each lookup table corresponds to a range of trailer angles, and is used when the trailer angle is within that range. When the two-dimensional length 120 falls between two break points on the lookup table, the software module within the controller 104 can either select the average of the possible three-dimensional wheelbases or select whichever wheelbase is closest to the determined values.

In another example, the correlation between angle and two-dimensional wheelbase can be converted to a best fit regression formula using the trailer angle and the two-dimensional wheelbase as inputs, and the controller 104 uses the formula to determine the correct output.

By performing the wheelbase determination multiple times at multiple different angles and filtering the raw determined three-dimensional wheelbases using a median filter, noise and erroneous determinations are removed and an accurate three-dimensional wheelbase is determined. The accurate three-dimensional wheelbase is stored by the controller 104 and can be provide to any vehicle systems that require, or would benefit from, the three-dimensional wheelbase.

In yet another example, the trailer detection parameter determination software module can use a substantially identical process to determine the length of the trailer instead of the wheelbase length. The trailer length determination replaces the identification of the rear wheels with identification of a rear feature of the trailer. In one example, the rear feature of the trailer is a bottom corner of the trailer.

Although an example embodiment has been disclosed, a worker of ordinary skill in this art would recognize that certain modifications would come within the scope of the claims. For that reason, the following claims should be studied to determine their true scope and content.

What is claimed is:

1. A method for determining a trailer detection parameter of a trailer comprising:
receiving an image from at least one camera at a controller, the at least one camera defining a field of view including at least a portion of a vehicle trailer;
determining a trailer angle of the vehicle trailer relative to a tractor;

identifying at least one feature in an image of the trailer;
determining a two-dimensional distance from the at least one feature to a predefined position on the image, wherein the two-dimensional distance corresponds to a number of pixels in the image; and
converting the two-dimensional distance to a three-dimensional distance based at least in part on the determined trailer angle, wherein the three-dimensional distance is a trailer detection parameter of the trailer, wherein converting the two-dimensional distance to the three-dimensional distance is performed by referencing at least one lookup table that is based upon the determined trailer angle, the lookup table mapping the number of pixels to the three-dimensional distance.

2. The method of claim 1, wherein the trailer detection parameter is a wheelbase length and the at least one feature is at least one wheel.

3. The method of claim 2, wherein the at least one wheel includes a first wheel and a second wheel, and the two-dimensional distance from the at least one wheel to the predefined position on the image is a distance from the mid-point between the first wheel and the second wheel to the predefined position on the image.

4. The method of claim 2, wherein the at least one wheel is a single wheel, and wherein the two-dimensional distance from the at least one wheel to the predefined position on the image is a distance from the mid-point of the wheel to the predefined position on the image.

5. The method of claim 1, wherein the trailer detection parameter is a trailer length from a hitch point to a rear edge of the trailer and the at least one feature is a feature disposed at the rear edge of the trailer.

6. The method of claim 5, wherein the feature disposed at the rear edge of the trailer is a bottom corner of the trailer.

7. The method of claim 1, wherein identifying at least one wheel in an image of the trailer comprises identifying the at least one wheel using an image-based object detection system stored in the controller.

8. The method of claim 7, wherein the controller is one of a vehicle control unit and a camera mirror system controller.

9. The method of claim 1, wherein the field of view is one of a class II view and a class IV view.

10. The method of claim 1, wherein the predefined position is a position at an edge of the field of view and the two-dimensional distance is a measured distance between a mid-point of a wheel and the predefined position within the image itself.

11. The method of claim 1, wherein converting the two-dimensional distance to the three-dimensional distance is performed at multiple determined trailer angles, each of the multiple determined trailer angles providing a respective lookup table that maps the two-dimensional distance to the three-dimensional distance.

12. The method of claim 11, wherein the converting step is performed for multiple determined trailer angles, and comprising a step of choosing a best three-dimensional distance based upon multiple three-dimensional distances at the multiple determined trailer angles.

13. The method of claim 12, wherein the choosing step is performed by one of averaging multiple three-dimensional distances or selecting the three-dimensional distance corresponding to the closest two-dimensional distance.

14. The method of claim 11, wherein the multiple trailer angles are in a range of 20 to 70 degrees.

15. The method of claim 12, wherein the choosing step is performed using a conversion function including a best fit regression formula.

16. The method of claim 14, further comprising reiterating the method across multiple determined trailer angles within the range of 20 to 70 degrees and storing each determined three-dimensional wheelbase length in a memory.

17. The method of claim 16, further comprising filtering the stored three-dimensional wheelbase lengths using a median pass filter.

18. The method of claim 17, wherein the memory stores an output of the median pass filter as a determined wheel base length.

19. A camera mirror system for a vehicle comprising:
at least one camera defining a field of view including at least a portion of a trailer;
a controller including a processor and a memory storing an image-based object detection module configured to identify at least one wheel within the object detection system, a trailer angle module configured to determine a trailer angle relative to a tractor, and a trailer detection parameter determination module configured to determine a trailer wheelbase length based on the determined trailer angle and an image received from the at least one camera; and
wherein the trailer detection parameter determination module includes instructions configured to cause the processor to determine a two-dimensional distance from at least one trailer parameter to a predefined position on the image, wherein the two-dimensional distance corresponds to a number of pixels in the image, wherein the trailer detection parameter determination module includes instructions configured to cause the processor to convert the two-dimensional distance to a three-dimensional distance based at least in part on the determined trailer angle, and the processor converting references at least one lookup table that maps the number of pixels to the three-dimensional distance based upon the determined trailer angle.

20. The camera mirror system of claim 19, wherein the processor converting uses a conversion function including a best fit regression formula.

21. A vehicle controller comprising:
an image input configured to receive an image from at least one camera;
a processor and a memory, the memory storing an image-based object detection module configured to identify at least one feature within a received image, a trailer angle module configured to determine a trailer angle relative to a tractor, and a trailer detection parameter determination module configured to determine a trailer detection parameter based on the determined trailer angle and an image received from the at least one camera; and
wherein the trailer detection parameter determination module includes instructions configured to cause the processor to determine a two-dimensional distance from at least one trailer parameter to a predefined position on the image, wherein the two-dimensional distance corresponds to a number of pixels in the image, and wherein the trailer detection parameter determination module includes instructions configured to cause the processor to convert the two-dimensional distance to a three-dimensional distance based at least in part on the determined trailer angle, and the processor converting references at least one lookup table that maps the number of pixels to the three-dimensional distance based upon the determined trailer angle.

22. The vehicle controller of claim 21, wherein the memory further includes a filtering module configured to filter the memory listing of determined three-dimensional distances using a median pass filter.

* * * * *